United States Patent [19]
Jardine et al.

[11] Patent Number: 5,928,368
[45] Date of Patent: Jul. 27, 1999

[54] METHOD AND APPARATUS FOR FAULT-TOLERANT MULTIPROCESSING SYSTEM RECOVERY FROM POWER FAILURE OR DROP-OUTS

[75] Inventors: Robert L Jardine, Cupertino; Richard M. Collins, Campbell; Larry D. Reeves, Palo Alto, all of Calif.

[73] Assignee: Tandem Computers Incorporated, Cupertino, Calif.

[21] Appl. No.: 08/265,585

[22] Filed: Jun. 23, 1994

[51] Int. Cl.⁶ .................................................. G06F 11/00
[52] U.S. Cl. .................................. 714/22; 714/14; 714/10
[58] Field of Search ............................... 395/575, 182.12, 395/182.2, 182.08, 182.09, 182.1, 182.11, 750.01; 371/11.1, 11.3

[56] References Cited

U.S. PATENT DOCUMENTS

| | | | |
|---|---|---|---|
| 4,228,496 | 10/1980 | Katzman et al. | 395/200 |
| 4,321,666 | 3/1982 | Tasar et al. | 395/575 |
| 4,323,966 | 4/1982 | Whiteside et al. | 395/575 |
| 4,356,546 | 10/1982 | Whiteside et al. | 395/575 |
| 4,590,554 | 5/1986 | Glazer et al. | 395/200 |
| 4,634,110 | 1/1987 | Julich et al. | 395/182.08 |
| 4,757,442 | 7/1988 | Sakata | 395/182.1 |
| 4,817,091 | 3/1989 | Katzman et al. | 371/9.1 |
| 4,951,069 | 8/1990 | Rabjohns et al. | 395/182.21 |
| 4,991,174 | 2/1991 | Mori et al. | 371/15.1 |
| 5,301,309 | 4/1994 | Sugano | 395/182.1 |
| 5,301,311 | 4/1994 | Fushimi et al. | 395/182.21 |
| 5,317,752 | 5/1994 | Jewett et al. | 395/750 |
| 5,367,697 | 11/1994 | Barlow et al. | 395/183.11 |
| 5,452,441 | 9/1995 | Espsito et al. | 395/182.11 |

*Primary Examiner*—Albert DeCady
*Assistant Examiner*—Pierre Elisea
*Attorney, Agent, or Firm*—Townsend and Townsend and Crew LLP

[57] ABSTRACT

Multiple processors are connected to form a multiprocessor system having interprocessor communicating capability. In the face of a power-fail signal, indicating that possible power loss is imminent, a processor will proceed through a shut-down procedure to save the present operating state so that when power is re-applied the processor can continue from the operating state it left when power was lost. The shut-down procedure concludes with the processor broadcasting messages to all other processors that it is undergoing a power-fail shut-down which is noted by the other processors to later cause them to enter a cautious mode of operation so as to not exclude the processor in any system configuration involving agreement of all processors by reason of the processor's loss of power.

10 Claims, 3 Drawing Sheets

METHOD AND APPARATUS FOR FAULT-TOLERANT MULTIPROCESSING SYSTEM RECOVERY FROM POWER FAILURE OR DROP-OUTS

BACKGROUND OF THE INVENTION

This invention relates generally to fault-tolerant multiple processor systems, and in particular to a technique that permits the system to recover from momentary or very short drops in primary power that may be noticed by fewer than all of the processors.

Fault tolerant computing, evolving as it did from early specialized military and communications systems, is found today in a variety of commercial system designs. Fault tolerant designs seek to provide the advantages of increased system availability and continuous processing together, if possible, with the ability to maintain the integrity of the data being processed. Designs for achieving fault tolerance range from providing sufficient redundancy to reconfigure around failed components to using "hot backups" that sit and wait for a failure of a primary unit before being called into action. Also included in many fault tolerant designs are methods of protecting data in the face of the inevitable: a fault that may bring down the system.

One fault-tolerant design approach, an example of which can be found in U.S. Pat. No. 4,817,091, is a fault-tolerant multiple processor system in which the individual processors, in addition to performing individual and independent tasks, are provided the ability to communicate with one another. Using this communication ability, each processor will periodically broadcast its well-being by sending a message (called an "I'm Alive" message) to all the other processors of the system. The absence of an I'm Alive message from any processor is an indication that the silent processor might have failed and may be unable to recover. When the absence of an expected I'm Alive message is noted by the other processors of the system, they will initiate a "regroup" operation to determine what processors are still present and operating in the system, and to confirm the silent processor is no longer available. The regroup operation involves each processor broadcasting multiple messages telling its companion processors its view of the system (i.e. what processors it sees as still operating). If a processor has failed, and does not participate in the regroup operation, it will be ostracized from further communication in the system so that even if the failed processor at some subsequent time begins to send messages they will be ignored. (Actually, an implementation of this prior art technique does send a reply in the form of a "poison packet" which, in effect, informs the ostracized processor that it has been excluded from the system and that it should shut itself down.) The processes (i.e. programs) running on the failed processor can be taken over by another processor in the system.

Another feature of such fault-tolerant systems is to prevent loss of data, and to provide quick and more complete recovery from unavoidable shut-downs of operation from, for example, loss of operating power, ranging from total loss to momentary loss. Some fault-tolerant systems provide a backup power in the form of batteries in the event primary power is lost to allow the system to maintain memory-stored data. Accordingly, if advance warning is provided of impending power loss, a processor may have time to store its operating state and data before the loss of primary power puts the processor in "hibernation."

During the period a processor is preparing for hibernation, and thereafter restoring its pre-hibernation state, it is not bothering to send the periodic I'm Alive messages. The time taken is greater than that between expected I'm Alive transmissions. This creates the possibility of a problem: if a momentary power drop occurs to cause only one or a few of the system's processors to receive a warning and to go into hibernation, they will cease their I'm Alive broadcasts, causing those processors that did not experience a power warning to regroup and ostracize those that did. Thus, even though all processors of the multiple processing system may be in proper working order, a momentary drop in primary power sensed by less than all the processors of the system can cause a decrease in overall operating availability and/or efficiency of the system.

SUMMARY OF THE INVENTION

The present invention is directed to use by those types of fault-tolerant multiple processor systems described above, i.e., those that periodically communicate their status to one another, and additionally have the ability to initiate a shut-down procedure, when a power-fail warning is received, saving information that is used to quickly resume operation when able. The present invention provides a simple, yet effective method for permitting a multiple processor system to recover from very short, intermittent, or erroneous power-fail indications in a manner that precludes an operational processor that experienced a power-fail warning (while other processors did not) from being ostracized from the system.

Broadly, the invention includes having each processor concluding a power-fail shut-down ("pre-hibernation") procedure with a broadcast of a power-fail message to all processors of the system that the processor is experiencing a power-fail warning, and that it has initiated a pre-hibernation procedure. The other processors, upon receipt of the broadcast, will record its receipt. At any later time, when a regroup operation is initiated to determine the complement of multiple processors present in the system, any of the processors, noting recordation of prior receipt of a power-fail message, will so inform the system, causing a "cautious" regroup operation to be initiated. The cautious regroup operation provides more time for the processors to make themselves known, so that in the event a regroup operation is initiated because one of the processors has been momentarily silenced as a result of a power-fail warning, it will still have time to recover and be included in the regroup operation.

DESCRIPTION OF THE PREFERRED EMBODIMENT

Figure 1:
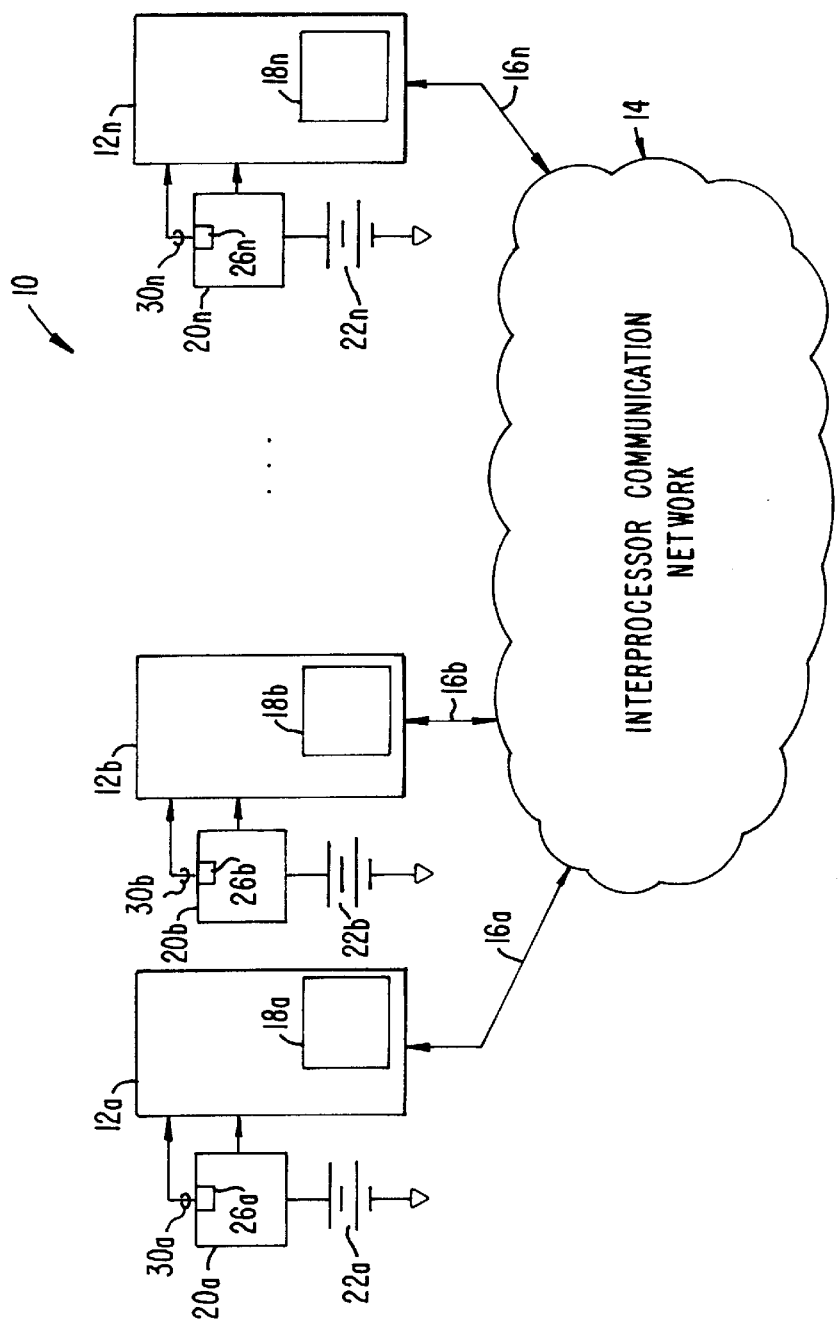
FIG. 1 is a simplified block diagram of A multiple processing system in which the processor units of the system are communicatively intercoupled for incorporating use of the present invention.

Turning now to FIG. 1, there is illustrated a multiple processing system 10, designated generally with the reference numeral 10, comprising processors 12a, 12b, ..., 12n. The actual number of processors 12 could be anything more than one for effective use of the present invention, although the multiple processor systems for which the present invention has been designed typically are limited to no more than sixteen processors. It will be evident to those skilled in this art, however, that the present invention does not limit the actual number of processors that can be used.

The multiple processing system 10 may be constructed, using the teachings of the aforementioned U.S. Pat. No. 4,817,091 and, therefore, to the extent necessary is incorporated herein by reference.

The processors 12 are interconnected by a network 14 and bus connections 16 that provide the processors 12 with interprocessor communication. The network 14 may be implemented by a bus system that interconnects processors 12, in parallel, and is independent from any input/output (I/O) system that the processors may have, such as is taught by the aforementioned U.S. Pat. No. 4,817,091. Alternatively, the network 14 could be implemented as part of a joint I/O system that provides the processors 12 not only with access to various I/O units (e.g., printers, secondary storage, and the like—not shown), but also provide communication paths for interprocessor communication for the processors 12.

Internal or otherwise associated with each of the processors 12 is a memory 18 that is independent from the memory 18 of the other processors 12. Also associated with each of the processors 12 is a power supply 20 that receives primary power (e.g., alternating current; not shown) to supply therefrom the necessary electrical power (e.g., direct current) for operation of the associated processor 12. Each of the power supplies 20 includes a backup source of power in the form of a battery 22. The batteries 22 supply the necessary power to allow the memories 18 of the processors 12 to retain their content in the event of power the primary power is lost or otherwise disrupted.

Included in each of the power supplies 20, or otherwise associated therewith, are supervisor circuits 26 of generally conventional design that function to maintain a vigil over the operation of the power supplies 20. In particular, insofar as is pertinent here, the supervisor circuits 26 can detect drops in power to develop a power-fail warning signal that is communicated, via signal line 30, to the associated processor 12. When the warning of an impending power drop or outage is asserted, the processors 12 usually will have a guaranteed period of time before all operation must cease for lack of power. The processors 12, therefore, will be able to use that time, as will be discussed in greater detail below, to prepare for the impending hibernation being forced upon them.

The network 14 forms the medium that allows the processors 12 to send and receive messages to and from one another to communicate data, status, and other information therebetween. In addition, each of the processors 12 use the network 14 for broadcasting messages, at periodic intervals, that indicate the continued operation of the broadcasting processor, called "I'm Alive" messages. Approximately every 1.2 seconds each of the processors 12 will broadcast to all other of the processors 12 an I'm Alive message, containing among other information an identification of the broadcasting processor. Approximately very 2.4 seconds each processor 12 will check to see what I'm Alive messages it has received from its companion processors, and a failure to receive an I'm Alive message from a processor (e.g., processor 12b) known to previously be a part of the system 10 will raise the assumption that the processor 12b has, for whatever reason, ceased operation. The failure to receive an I'm Alive message from a processor known to have been part of the system will prompt the other processors to initiate a "Regroup" operation in which the other processors begin broadcasting a Regroup message, identifying the sending processor 12, and containing that processor's view of the system, including an identification of those processors it believes form the system. A successful Regroup operation, initiated by failure to receive an expected I'm Alive message from, for example, processor 12b, will result in the remaining processors ignoring any further message traffic from the processor 12b, should it send any. In effect, the failure to receive an I'm Alive message within the allotted time will cause the other processors to ostracize the mute processor(s) from the system.

A Regroup operation, which is also initiated automatically when the system 10 recovers from a loss of power, proceeds through multiple stages, only the first of which is relevant here. The first stage of the Regroup operation, and its modification to accommodate the present invention, is described more fully below in connection with FIG. 4.

Before continuing with the description of a regroup operation, other features of the system 10 will be explained in order to provide an understanding of the interaction of those features, and the Regroup operation, with the present invention. One such other feature is the ability, through the aegis of the supervisor circuits 26, of providing early warning of an impending loss of power; the other feature is the action taken in response to that warning. As indicated above, the supervisor circuit 26 is associated with the power supply 20 of each processor 12 to provide advance warning of a loss of primary power in the form of a power-fail warning signal.

Figure 2:
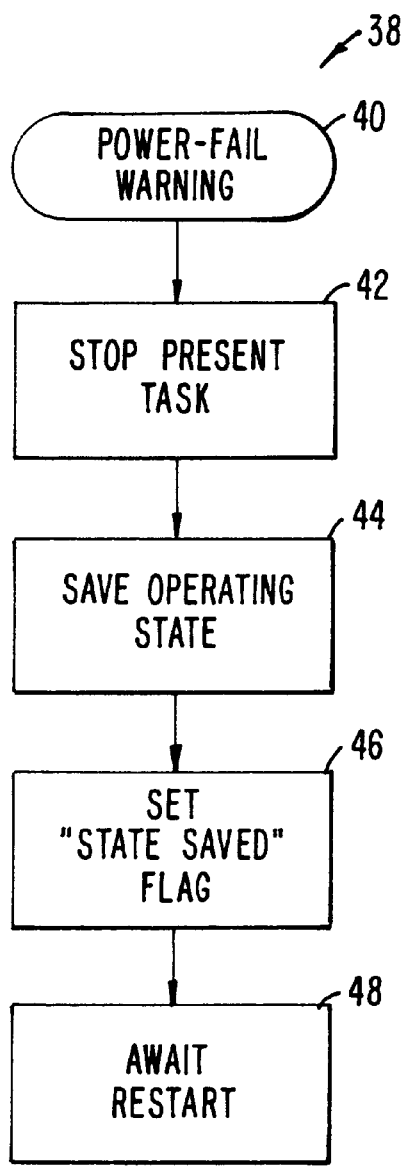
FIG. 2 is a flow diagram illustrating the steps previously taken in response to a power-fail signal to prepare for hibernation.

Upon receipt of the power-fail warning signal, a processor 12 has a period of time during which it is guaranteed good power before it must cease operation. (This period of time can vary depending upon the tasks that must be performed before hibernation. For example, some systems manufactured by the assignee of this invention have a guarantee that power will remain nominal for approximately 5 milliseconds. Other systems, notably those with more cache whose content must be stored to the memory 18, require more time.) During that time period, the processor 12 will initiate the pre-hibernation routine illustrated in FIG. 2. Thus, as FIG. 2 illustrates, receipt at step 40 of the power-fail warning signal will move the processor 12 to step 42 where the processor will gracefully suspend any task it may then be performing. The processor 12 will then, at step 44, undertake to save its present operating state to memory 18 so that, if and when primary power is later restored, the processor may re-start the task it was performing with a minimum of effort, and without loss of data, assuming the saved state and data is still available when primary power is restored. The processor 12 then proceeds to step 46 to write a flag (not shown) in memory that indicates the state was successfully saved. After the processor state is saved, the processor then puts itself into a hibernation (idle) state to await the loss of power and subsequent re-start when power is restored, or if power is not lost (eg., the warning resulted from a momentary power drop), just the re-start (i.e, re-initialization). This entire process, from receipt and recognition of the power-fail warning signal to writing the flag indicating that the processor state was successfully saved normally takes approximately one-half the amount of guaranteed time of good power, or less. This is more than enough time before the actual loss of power is felt.

Later, when primary power is restored, the processor need not re-create prior operating data; rather, the processor can quickly resume operation by merely restoring the operating state and data saved prior to hibernation. Thus, during the restart and re-initialization operation to bring the processor 12a back on-line, the processor 12a will check the "state saved" flag to determine if, in fact, during the pre-hibernation sequence the processor's operating state was successfully saved. If not, of course, the processor must go through a much longer initialization period in order to restore the processor to that point of operation it was at before or at the assertion of the power-fail warning signal that put it into hibernation. However, if the flag is set to indicate that the operating state was successfully saved during the pre-hibernation sequence, the processor 12a can quickly restore the pre-hibernation operating state from the memory 18a.

During the pre-hibernation sequence of processor 12a, and subsequent restart and initialization, the processor 12 will not be sending the periodic I'm alive, and herein lies the problem to which the present invention is directed. Such momentary power drops or fluctuations may not be noticed by all processors 12, but by only some of them. For example, assume that a power fluctuation causes the supervisor circuit 26a to assert the power-fail warning signal, but the supervisor circuits 26 (26b, . . . , 26n) of the remaining processors 12 (12b, . . . , 12n) did not detect the fluctuation, and therefore did not assert a power-fail warning signal. (Reasons for this include the fact that the power supplies 20 may not all have the same internal capacitance. Thus, those with a larger capacitance can mask small fluctuations, whereas other with smaller internal capacitance may not. Further, the power supplies 20 may be presented with different loads by the associated processors such as would be the case involving processors with different amounts of memory. Also, the supervisor circuit 26 could be faulty, signalling false indications of power drops.) The asserted power-fail warning signal from the supervisor circuit 26a will cause the processor 12a to go through its pre-hibernation sequence of FIG. 2, during which time the processor 12a will not send I'm Alive messages. Accordingly, the other processors 12b, . . . , 12n of the system 10, which look for the I'm Alive signals every 2.4 seconds, will note the absence of an I'm Alive transmission from the processor 12a. This will cause the remaining processors (12b, . . . , 12n) to initiate a Regroup operation that most likely will be completed before the processor 12a will come out of its self-imposed hibernation. The Regroup operation (which is described in more detail below) will conclude without the participation of the processor 12a, resulting in the processors setting their respective data structures in a manner that ostracizes processor 12a. Thereafter, insofar as the processors 12b, . . . , 12n are concerned, the processor 12a is no longer part of the system 10, and any messages from that processor will be ignored by the others. The function of the processor 12a will be taken over by one of the other processors.

The foregoing discussion should now make clearer the problem to which the present invention seeks to solve: being too quick to ostracize a processor 12.

Figure 3:
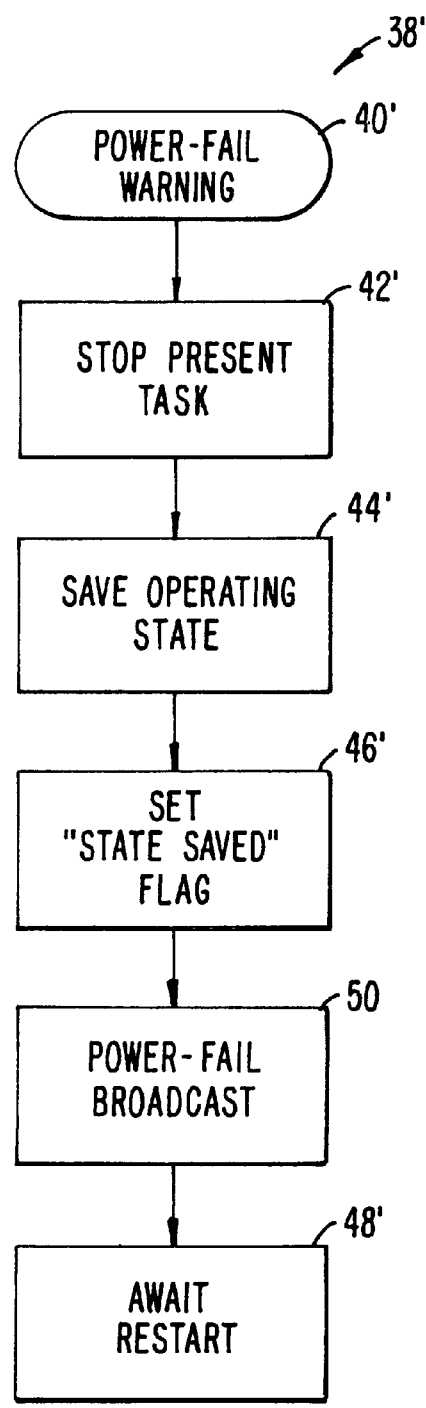
FIG. 3 is a flow diagram illustration of the steps taken in response to a power fail signal, according to the present invention, to prepare for hibernation.
Figure 4:
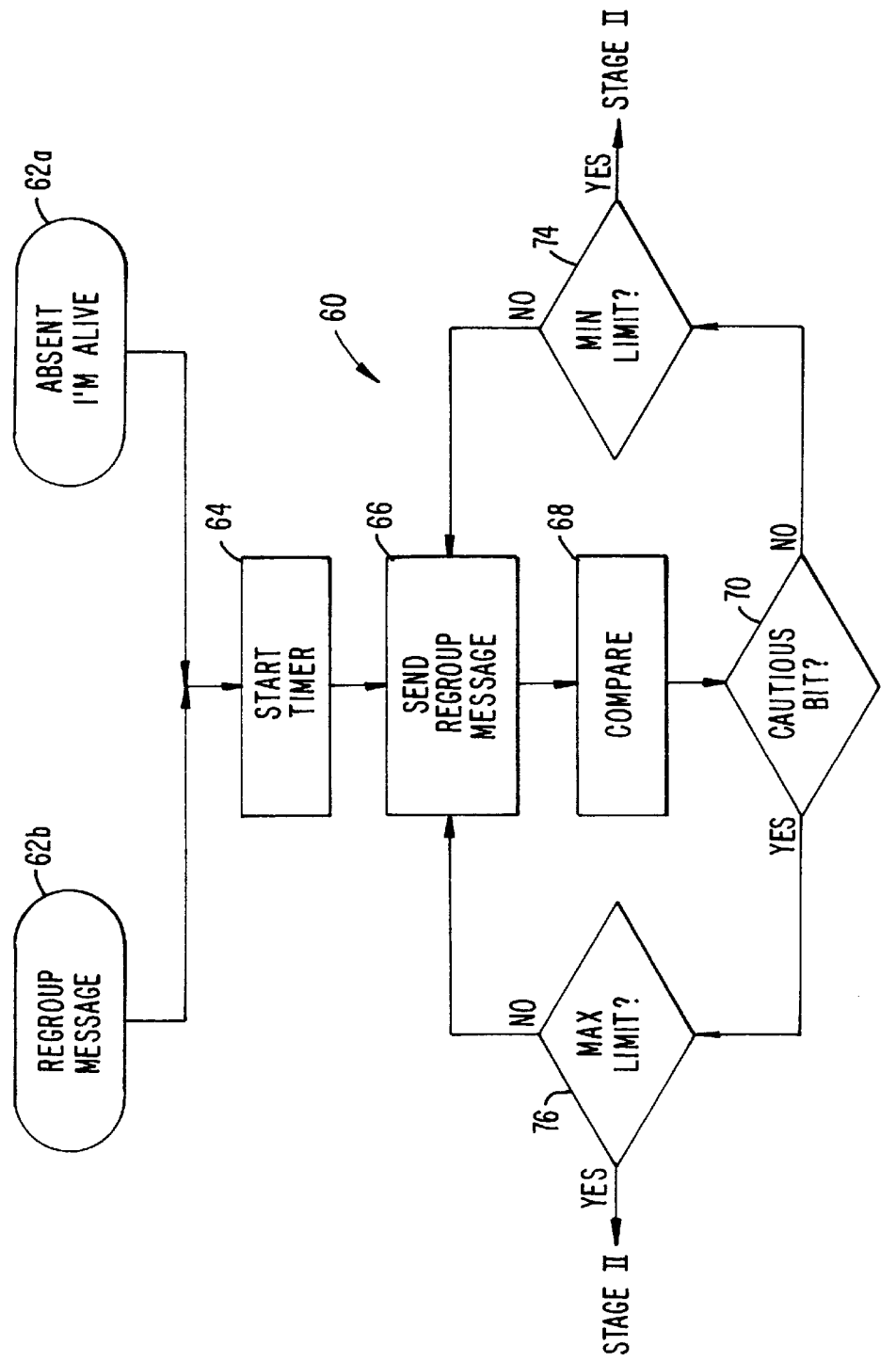
FIG. 4 is a flow diagram that broadly illustrates the regroup operation taken by the processors of FIG. 1 to determine what processors are present in the system, and what are not.

FIGS. 3 and 4 illustrate the solution to inadvertent ostracization of a processor provided by the present invention. Referring first to FIG. 3 there is illustrated the pre-hibernation sequence that results from receipt of the power-fail warning signal-modified according to the present invention. As FIG. 3 shows, the modified pre-hibernation routine, here designated by the reference numeral 38', continues to have the processor 12 proceed through the steps of suspending the present task (step 42'), saving the operating state of the processor 12 (step 44') and, if successfully saved, setting the "state saved" flag (step 46'). However, before going in hibernation (step 48') to await a re-awakening, the processor will, according to the present invention, perform the additional step, time permitting, of broadcasting to all other processors 12 that the broadcasting processor has received a power-fail warning signal and, as a result, is initiating a pre-hibernation sequence. As discussed further below, those processors receiving the power-fail broadcast will record that receipt so that when the next regroup operation occurs, the possibility of a momentarily unresponsive processor, as a result of a power-fail routine, can be taken into account.

The modified pre-hibernation sequence 38' of FIG. 3 then concludes in the same manner as the pre-hibernation sequence 38 of FIG. 2 with step 48' in which the processor goes into hibernation to await restart and re-initialization.

The regroup operation is performed in a number of stages, but only the first stage, Stage I, is important here to the understanding to the present invention. The other stages differ from stage I in that the other stages are not based primarily upon the passage of time, as is Stage I (as will be seen).

Turning now to FIG. 4, a flow diagram, indicated generally with the reference numeral 60, illustrates Stage I of the Regroup operation—as modified according to the teachings of the present invention, Stage I of the Regroup operation is executed by each of the processors 12. In fact, since the processors 12 do not have their operations synchronized, certain processors will make the check for I'm Alive messages earlier than others, and will enter the Regroup operation before the others.

Stage I of the Regroup operation may also be entered by a processor 12, even though it may not yet have made a check for absence of an I'm Alive message if it receives first a Regroup message (from a processor 12 that has detected absence of an I'm Alive message). Thus, Stage I will begin (steps 62a or 62b) when a processor 12 notes either (step 62a) that a companion processor has failed to transmit its periodic I'm alive message, or (step 62b) the processor 12 receives a Regroup message from another of the processors 12. Either of these occurrences, when noted by a processor 12, will case it to commence Stage I of the Regroup operation. Next, the processors 12 participating in the Regroup operation will each start an internal timer (not shown) that will determine the time for Stage I operation. At step 66 each of the processors 12 will send a Regroup message, containing the processor's view of the system 10, including the identification of those processors 12 it believes form the system, its own identity, and a cautious bit. If any power-fail broadcast was received by the processor 12 prior to entering the Regroup operation 60, or prior to step 66, the cautious bit will be set. This Regroup message will prompt all other processors 12, if they have not already (by also noting the failure of a processor 12 to send an I'm Alive message), to also enter the Regroup operation. If any of the other processors 12, upon entering the Regroup operation at step 62 notes that a broadcast of a power-fail message was received since the last Regroup operation, the Regroup message of that processor will have its cautious bit set.

At step 68, the regroup message(s) received by each processor 12 will be examined, and the view of the system contained in the message compared to that of the processor, as maintained in the memory 18. If there are differences, the system view maintained in memory 18 will be updated accordingly.

At step 70, the received Regroup messages are checked to see if any have their cautious bit set. If not, the operation proceeds to step 74, where a minimum time value is compared to the internal timer (not shown) of the processor 12. If the value exhibited by the internal timer equals or exceeds the minimum time value, Stage I of the Regroup operation 60 will be exited in favor of the next stage of the Regroup operation, Stage II. If, on the other hand, the cautious bit of one of the received Regroup messages is set, step 76 is entered after step 70 and a maximum limit value is compared to the value of the processor's internal counter. If the value of the internal counter exceeds that of the maximum limit value, Stage I of the Regroup operation is left for Stage II.

Note that if a processor 12 receives a momentary or erroneous power-fail warning at any time before, or during, execution of Stage I of the Regroup operation, and it is able to broadcast that fact, Stage I will use the cautious mode and the processor will ultimately be included in the operation. Thus, inadvertent ostracization due to momentary power drops, or erroneous operation of the supervisor circuit 26 will be prevented by the present invention.

Stage II was not modified to accommodate the present invention. For that matter, Stage I was not modified for the present invention. The check for the cautious bit was present before modification of the pre-hibernation routine 38' (FIG. 3), but for other reasons not relevant to the present invention. The principle difference between Stage I and Stage II is the fact that Stage I continues until the timer set at step 64 times out; Stage II will not end until all participating processors 12 agree as to the make-up of the system.

The minimum limit value will keep the processor 12 in Stage I approximately 2 seconds, during which time the processor will continue to send Regroup messages, compare what it receives with their its data structure, and make changes as necessary. If the cautious bit is set, the period is approximately ten seconds, more than enough time for any processor who might have been put into hibernation by a detected power fluctuation to be re-started and to participate in the Regroup operation of Stage I (and subsequent Regroup stages).

There is an alternate approach to implementing Stage I. Referring again to FIG. 1, according to this alternate approach each processor 12 will maintain an indication of the state of the cautious bit. (There are other reasons, not relevant here, for setting the cautious bit in order to extend the time that Stage I operates.) All steps shown in FIG. 4 remain, except that at step 70 the cautious bit that is checked by each processor 12 is the one that processor maintains; the cautious bit of received Regroup messages is not taken into consideration. Thus, some of the processors 12 participating Stage I of the Regroup operation may have their internal cautious bits set to a one state (dictating a loop that excludes step 76, but includes step 74) while others have their cautious bits set to the other state (dictating a loop that includes step 76). Therefore, given this situation, some of the processors 12 will leave Stage I in favor of Stage II of the Regroup operation while others remain in Stage I.

Those processors that leave Stage I and enter Stage II will have an internal list of the processors that participated in Stage I, including any processors that also go to Stage II, and those that remain in Stage I. Stage II of the Regroup operation is normally exited when the processors 12 participating in Stage II agree as to the view of the system 10. However, there is a time limit on how long the processors 12 can remain in Stage II. If that limit is exceeded, the participating processors will abort the Regroup operation in favor of initiating a new Regroup event.

When the Stage II of the Regroup operation is aborted, and the new Regroup operation initiated with Stage I, the processors 12 will increment a sequence number. This sequence number is also contained in any Regroup messages that are sent during the Regroup operation. In addition, when the Regroup is aborted the processors will set their internal cautious bits to a state that will cause them to use the cautious mode of Stage I; i.e., to execute the loop of Stage I that includes step 76 (but excludes step 74).

When those processors 12 that have exited Stage II of the Regroup operation re-enter Stage I, the processors 12 that were left in Stage I (because they were in the cautious mode) will still be in Stage I. Thus, the re-entering processors 12, after again starting their respective timers (not shown), will proceed to step 66 and send a Regroup message that have a sequence number as incremented. The sequence numbers maintained by the processors 12 should be identical. When a processor 12, at step 68, compares received Regroup messages with its own view of the system 10, it will also compare the sequence number contained in the received Regroup message with that it maintains. Those processors 12 that note a sequence number different from that they maintain, will abort the Regroup operation, exit Stage I, and immediately re-enter Stage I. Now, all processors are again executing Stage I of the Regroup operation, in the manner hereinbefore explained, and all will be in the loop that includes step 76; i.e., all execute the cautious mode of Stage I.

What is claimed is:

1. A processing system composed of a plurality of processor units interconnected for communicating messages therebetween, including presence messages sent by each of the plurality of processor units to the plurality of processor units during a regroup operation to determine the plurality of processor units of the processing system, each of the plurality of processor units having a source of power and a detector element for monitoring the source of power for power-fail situations to produce a power-fail signal indicative of a possible impending failure of the source of power, and responsive to the power-fail signal each of the processor units performing the steps of:

broadcasting a power-fail message to the plurality of processor units indicating receipt of the power-fail signal;

recording receipt of the power-fail message; and during a regroup operation, checking for a recordation of a prior received power-fail message, and if the recordation exists sending a cautious message to the plurality of processor units indicating receipt of a power-fail message.

2. The method of claim 1, wherein the regroup operation is conducted during a first period of time in absence of broadcasts of the power-fail message from any of the plurality of processor units.

3. The method of claim 2, wherein the regroup operation is conducted during a second period of time when a cautious message has been sent, the second period of time being greater than the first period of time.

4. A processing system composed of a plurality of processor units interconnected for communicating messages therebetween, including regroup messages sent by each of the plurality of processor units to the plurality of processor units during a regroup operation to determine the plurality of processor units of the processing system, each of the plurality of processor units including a source of power and a supervisor element for monitoring the source of power for power-fail situations to produce a power-fail signal indicative of a possible impending failure of the source of power, and responsive to the power-fail signal each of the processor units performing the steps of:

broadcasting a power-fail message to the plurality of processor units indicating receipt of the power-fail signal;

recording receipt of the power-fail message; and during a regroup operation, checking for a recordation of a prior received power-fail message, and if the recordation is found sending the regroup message to the plurality of processor units indicating receipt of a power-fail message.

5. The method of claim 4, including the step of continuing to send the regroup message for a predetermined period of time.

6. The method of claim 4, wherein the predetermined period of time is a first time period if no prior received power-fail message is recorded.

7. The method of claim 6, wherein the predetermined period of time is greater than the first time period if a prior received power-fail message is recorded.

8. The method of claim 4, wherein the processor units continue to broadcast the regroup message for a first period of time if recordation of a prior received power-fail message is absent.

9. The method of claim 8, wherein the processor units continue to broadcast the regroup message for a second period of time that is greater than the first period of time if recordation of a prior received power-fail message is present.

10. In a processor system including multiple processor units intercoupled for interprocessor communication, including broadcast by each of the multiple processor units a "I'm Alive" message indicative of the well-being of such broadcasting processor unit, each of the multiple processor units having a source of power and a supervisor element for monitoring the source of power to produce a power-fail warning indicative of a possible impending failure of the source of power, a method of recovery from the power-fail warning, comprising the steps of:

at least one of the multiple processor units detecting the power-fail warning and performing a shut-down that includes broadcasting to the other of the multiple processor units a power-fail message indicative of the one processor unit performing a shut-down;

each of the multiple processor units receiving the power-fail message, recording receipt of the power-fail message;

upon failure to receive the I'm Alive message from the one processor unit, the other of the multiple processors performing a regroup routine, including each of the other of the multiple processor units:

broadcasting a regroup message to the multiple processor units, determining presence of recordation of the power-fail message, and if present continuing to broadcast the regroup message for a period of time greater than if recordation of the power-fail message were not present.

* * * * *